US010467799B2

(12) United States Patent
Huang et al.

(10) Patent No.: US 10,467,799 B2
(45) Date of Patent: Nov. 5, 2019

(54) DYNAMICALLY MODELING AN OBJECT IN AN ENVIRONMENT FROM DIFFERENT PERSPECTIVES

(71) Applicant: Houzz, Inc., Palo Alto, CA (US)

(72) Inventors: Xiaoyi Huang, San Mateo, CA (US); Aaron Yip, Menlo Park, CA (US)

(73) Assignee: Houzz, Inc., Palo Alto, CA (US)

( * ) Notice: Subject to any disclaimer, the term of this patent is extended or adjusted under 35 U.S.C. 154(b) by 0 days.

(21) Appl. No.: 15/454,384

(22) Filed: Mar. 9, 2017

(65) Prior Publication Data

US 2018/0262713 A1    Sep. 13, 2018

(51) Int. Cl.
| | |
|---|---|
| *G06T 15/20* | (2011.01) |
| *G06T 19/00* | (2011.01) |
| *G11B 27/036* | (2006.01) |
| *H04N 5/76* | (2006.01) |
| *H04N 9/82* | (2006.01) |

(52) U.S. Cl.
CPC ............ *G06T 15/20* (2013.01); *G06T 19/006* (2013.01); *G11B 27/036* (2013.01); *H04N 5/76* (2013.01); *H04N 9/8205* (2013.01)

(58) Field of Classification Search
None
See application file for complete search history.

(56) References Cited

U.S. PATENT DOCUMENTS

| 6,081,273 A | * | 6/2000 | Weng ..................... G06T 7/85 345/420 |
|---|---|---|---|
| 2006/0050069 A1 | * | 3/2006 | Okuno ............... G06F 3/04815 345/419 |
| 2010/0289817 A1 | * | 11/2010 | Meier ..................... G06T 15/20 345/619 |
| 2014/0100997 A1 | * | 4/2014 | Mayerle ............. G06Q 30/0643 705/27.2 |
| 2016/0180544 A1 | * | 6/2016 | Hohteri ................. G06T 7/2033 348/157 |
| 2017/0358138 A1 | * | 12/2017 | Dack ..................... G06T 19/006 |

* cited by examiner

*Primary Examiner* — Jason A Pringle-Parker
(74) *Attorney, Agent, or Firm* — Schwegman Lundberg & Woessner, P.A.

(57) ABSTRACT

An object can be simulated in an environment using a three-dimensional model of the object as viewed from a virtual camera at a position in the environment. The position in the environment can be determined using user input or through visual analysis of a video recording. Composite frames depicting the modeled object may be played back based on the orientation of the playback device.

18 Claims, 15 Drawing Sheets ically modeling an object in an environment from different perspectives, according to some example embodiments.
DYNAMICALLY MODELING AN OBJECT IN AN ENVIRONMENT FROM DIFFERENT PERSPECTIVES

TECHNICAL FIELD

Embodiments of the present disclosure relate generally to image manipulation and, more particularly, but not by way of limitation, to modeling an object.

BACKGROUND

Increasingly, users would like to simulate an object (e.g., chair, table, lamp) in a physical room without having access to the object. For example, a user may be browsing a web store and see a floor lamp that may or may not match the style of the user's living room. The user may take a picture of his living room and overlay an image of the floor lamp in the picture to simulate what the floor lamp would look like in the living room. However, such an approach usually yields an unrealistic result because the lighting, orientation, and general layout of the floor lamp would appear to be pasted in the image and not appear natural looking. Further, the user cannot view the floor lamp from different angles in the room. It is to these challenges the following disclosure is directed.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
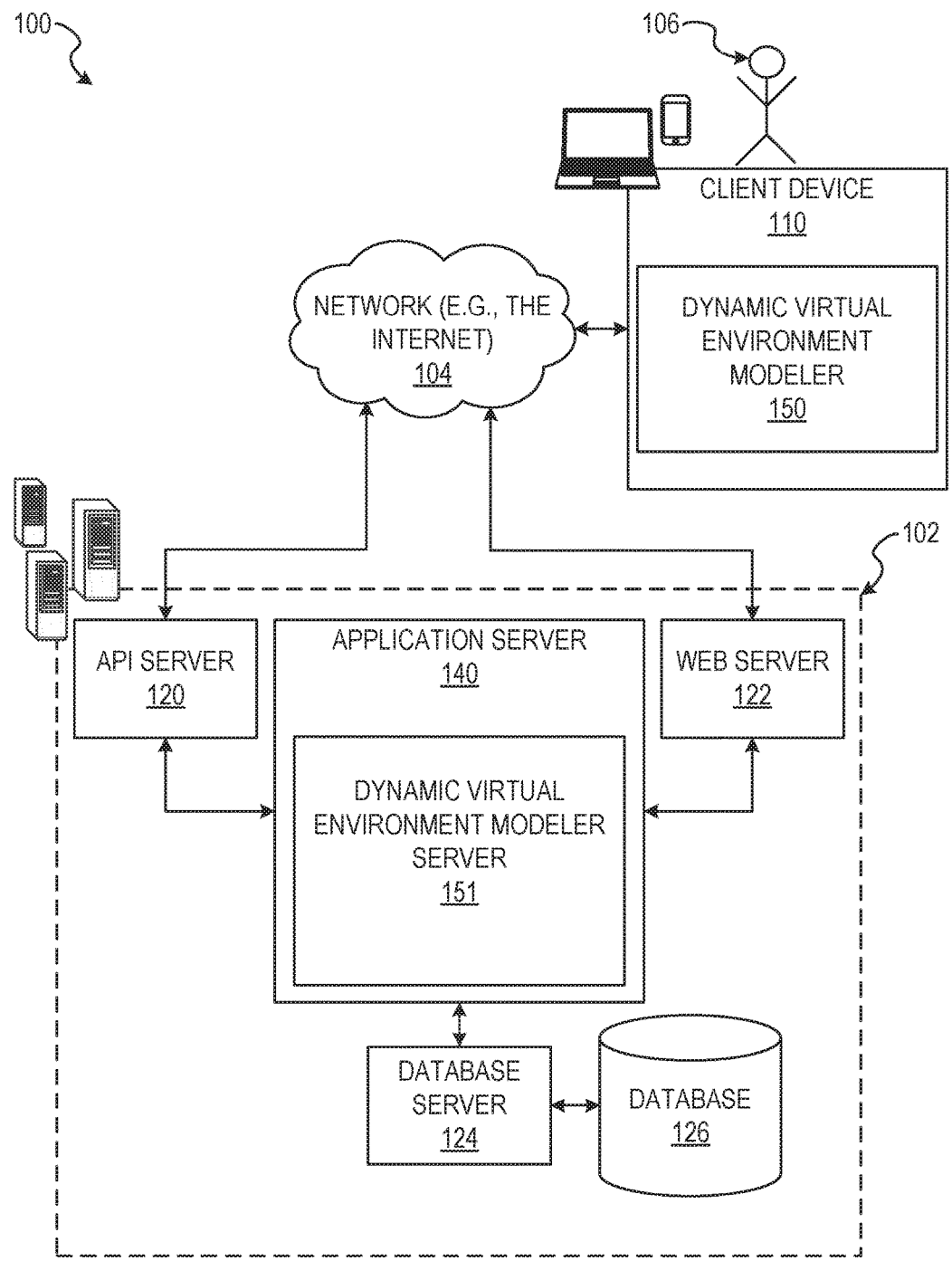
FIG. 1 is a block diagram illustrating a dynamic virtual environment modeler in a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some example embodiments, a dynamic virtual environment modeler enables a user to take a video recording of an environment and realistically model an object in the environment from different perspectives. The dynamic virtual environment modeler may be implemented as an application on a client device, such as a smart phone. A user uses the smartphone to record a video sequence of a room as the user moves the smartphone around the room. For example, the user may sweep the smartphone 180 degrees to create a video panorama of the room. The user can then drag and drop an digital representation of an object (e.g., an image of a table, a 3D model of the table), near a wall in the room to simulate how the table would look in the room. In some embodiments, some frames of the video sequence can be generated using extrapolation techniques, such as Motion estimation motion compensation (MEMC).

In response to the drag and drop of the object in the room, the dynamic virtual environment modeler may use 3D model data of the object to create renders of the object in the room. In some embodiments, the rendering may be performed in real-time using a game engine to create renders of the virtual object as the panorama is viewed on the client device. In some example embodiments, the dynamic virtual environment modeler pre-generates a render of the object for each frame depicting the object. The pre-generated renders can be added as an overlay as each frame is played back on the playback device. In those embodiments using extrapolated frames, the render of the object can be further overlayed on the extrapolated frames.

In some example embodiments, the playback ordering of the frames of the video recording is determined by the current orientation of the playback device. The frames may be played forward as the phone is rotated around the room in the same way the phone moved when it recorded the video. Further, should the phone be rotated back towards its initial orientation, the video frames may play backwards, again based on the orientation of the phone. This may be performed by recording the orientation of the phone for each frame using a gyroscope integrated in the phone. The orientation of phone at each frame may be stored as metadata for each frame. In playback mode, the dynamic virtual environment modeler determines the current orientation of the phone using a gyroscope, and plays the corresponding frame on the phone depicting the object simulated in the frame. Further, according to some example embodiments, playback can be controlled via buttons (e.g., a slider), auto-play, or touchscreen gestures (e.g., swipe left to play backwards, swipe right to play forwards).

In some example embodiments, to more accurately simulate the object in the room, the height of the phone as it generates the recording is taken into account. Users of different heights generally hold their phones at different heights when using their phones to record environments. The height difference causes a noticeable change in the perspective of video recordings. Conventionally, this difference of views due to user height causes modeling issues. For instance, a four foot user viewing a six foot floor lamp will have a very different view of the lamp than a six foot user.

To address the issues, the dynamic virtual environment modeler determines the height of the user that generated the video recording. The height of the user is used to set the height of a virtual camera used for rendering the object. In this way, users of different heights can achieve realistic object modeling results.

With reference to FIG. 1, an example embodiment of a high-level client-server-based network architecture 100 is shown. A networked system 102, in the example forms of a network-based rendering platform that can provide server-side rendering via a network 104 (e.g., the Internet or wide area network (WAN)) to one or more client devices 110. In some implementations, a user (e.g., user 106) interacts with the networked system 102 using the client device 110. The client device 110 may execute the dynamic virtual environment modeler 150 as a local application or a cloud based application (e.g., through an Internet browser). In some example embodiments, the real-time or pre-generated renders of the virtual object (e.g., a table) is performed on the dynamic virtual environment modeler server 151. The result of the renderings can be transmitted to the client device 110 for display within the dynamic virtual environment modeler 150. Further, according to some example embodiments, the dynamic virtual environment modeler 150 may perform the real-time or pre-generated renderings from the client device 110, e.g., using a render or game engine executing on the client device 110.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic, game consoles, set-top box, network personal computer (PC), mini-computer, and so forth. In an example embodiment, the client device 110 comprises one or more of a touch screen, accelerometer, gyroscope, biometric sensor, camera, microphone, Global Positioning System (GPS) device, and the like. In some embodiments, the client device 110 is the recording device that generates the video recording and also the playback device that plays the modified video recording during a playback mode. In some embodiments, the recording device is a different client device than the playback device, and both have instances of the dynamic virtual room modeler 150 installed. For example, a first client device using a first instance of a dynamic virtual room modeler may generate a simulation, and a second client device using a second instance of a dynamic virtual room modeler may receive the simulation over a network and display the simulation via a display screen. The instances may be platform specific to the operating system or device in which they are installed. For example, the first instance may be a iOS application and the second instance may be an Android application.

The client device 110 communicates with the network 104 via a wired or wireless connection. For example, one or more portions of the network 104 comprises an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a Wireless Fidelity (WI-FI®) network, a Worldwide Interoperability for Microwave Access (WiMax) network, another type of network, or any suitable combination thereof.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, one or more application server 140. The application server 140 can host a dynamic virtual environment modeler server 151, which can comprise one or more modules or applications and each of which can be embodied as hardware, software, firmware, or any combination thereof. The application server 140 is, in turn, shown to be coupled to a database server 124 that facilitates access to one or more information storage repositories, such as database 126. In an example embodiment, the database 126 comprises one or more storage devices that store information to be accessed by the dynamic virtual environment modeler server 151 or the dynamic virtual environment modeler 150. Additionally, in some embodiments, the model data may be cached locally on the client device 110. Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example.

Figure 2:
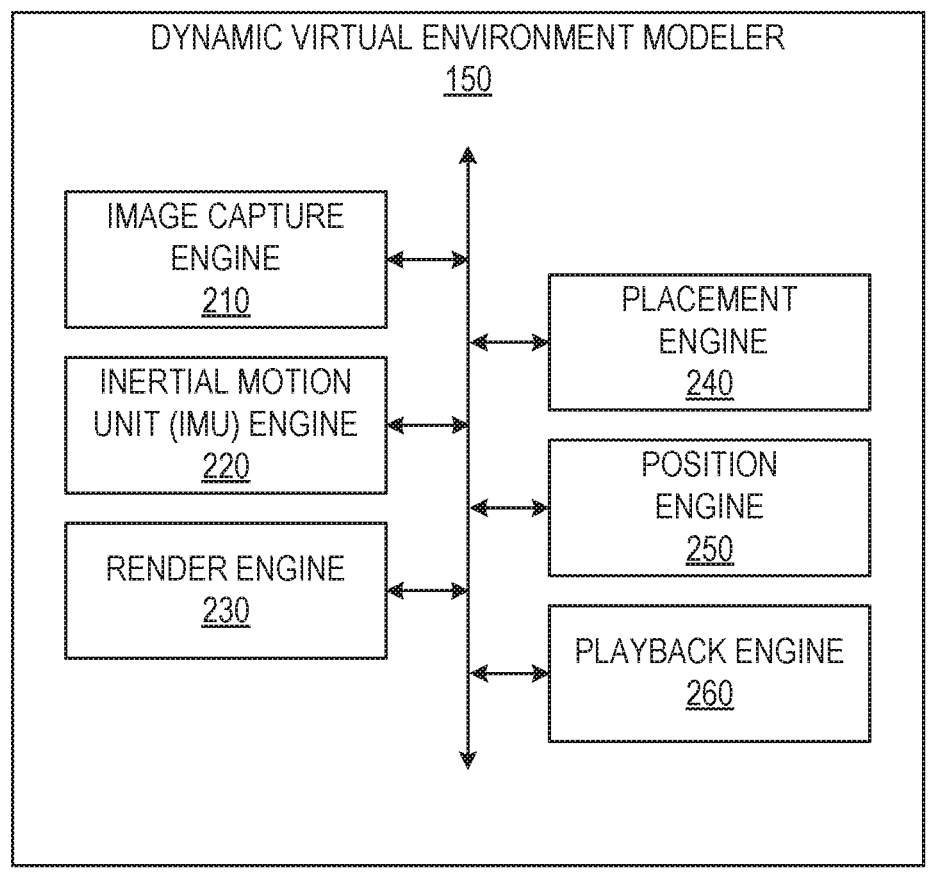
FIG. 2 is a block diagram showing example functional components provided within the dynamic virtual environment modeler, according to some example embodiments.

FIG. 2 illustrates a block diagram showing components provided within the dynamic virtual environment modeler 150, according to some embodiments. The components themselves are communicatively coupled (e.g., via appropriate interfaces) to each other and to various data sources, so as to allow information to be passed between the applications or so as to allow the applications to share and access common data. Furthermore, the components can access the database 126 via the database server 124 or local memory of the client device 110 to retrieve data for processing (e.g., model data, room data).

As illustrated, the dynamic virtual room modeler 150 comprises an image capture engine 210, an inertial motion unit (MU) engine 220, a render engine 230, a placement engine 240, a position engine 250, and a playback engine 260. The image capture engine 210 manages capturing or otherwise identifying the video recording being used for object simulation. In some example embodiments, the image capture engine 210 uses a camera of the client device 110 to generate a video recording of a room. In some example embodiments, the image capture engine 210 can receive a pre-generated video recording for use in the simulation processes below. For example, a high resolution video camera (not depicted) may generate the recording of the room and the image capture engine 210 can use the video camera generated recording or the simulation processes.

The IMU engine 220 is responsible for detecting the orientation of the client device 110 as the client device 110 generates the video recording. Each given frame of the video recording is associated with current position data (e.g., inertial motion sensor data), which is the gyroscope reading at the time a given frame was recorded, compass heading data from an integrated compass in the client device 110, or accelerometer data from an integrated accelerometer in the client device, according to sonic example embodiments. The current position data can be used to play a given frame during a playback mode. In some example embodiments, the IMU engine 220 includes schemes (e.g., probabilistic filtering over frames, structure from motion, Kalman filters, particle filters, SLAM) that can generate orientation data in place of or in addition to gyroscope readings. Further, in some embodiments, the MU engine 220 is configured to use other types of sensors, such as infrared sensors, to determine distances.

The placement engine 240 is responsible for providing a plurality of virtual objects to place within the room in the recording. For example, the placement engine 240 may display a menu having three virtual object options to place within the video recording. The user 106 can select one of the objects by dragging and dropping the selected virtual object onto an area of the room. In some example embodiments, the objects may be displayed initially in 2D form for efficient drag/drop purposes. Further, according to some example embodiments, the placement engine 240 also stores pose information describing the position of the virtual item relative to a virtual camera, and placement orientation of the virtual item with respect to the virtual camera.

The position engine 250 is configured to determine the position of the recording device. In some example embodiments, the position is the height of the recording device above the floor of the environment. Further, in some example embodiments, the position engine 250 determines the position engine by analyzing dimensions of imaged objects, using stereo-vision, assuming the position based on user height, direct input from the user, analysis of structured light, and/or time of flight.

The playback engine 260 manages playback of the video recording with the virtual object being simulated in the room using the metadata related to the frame of recording (e.g. orientation of recording camera during the capture of the frame) as well as 3D information (e.g. orientation, relative position, scale) of the object established and updated via the placement engine 240. In some example embodiments, the playback engine 260 displays a frame of the video recording based on the current orientation of the playback device (e.g., based on a gyroscope reading of the client device 110).

Figure 3:
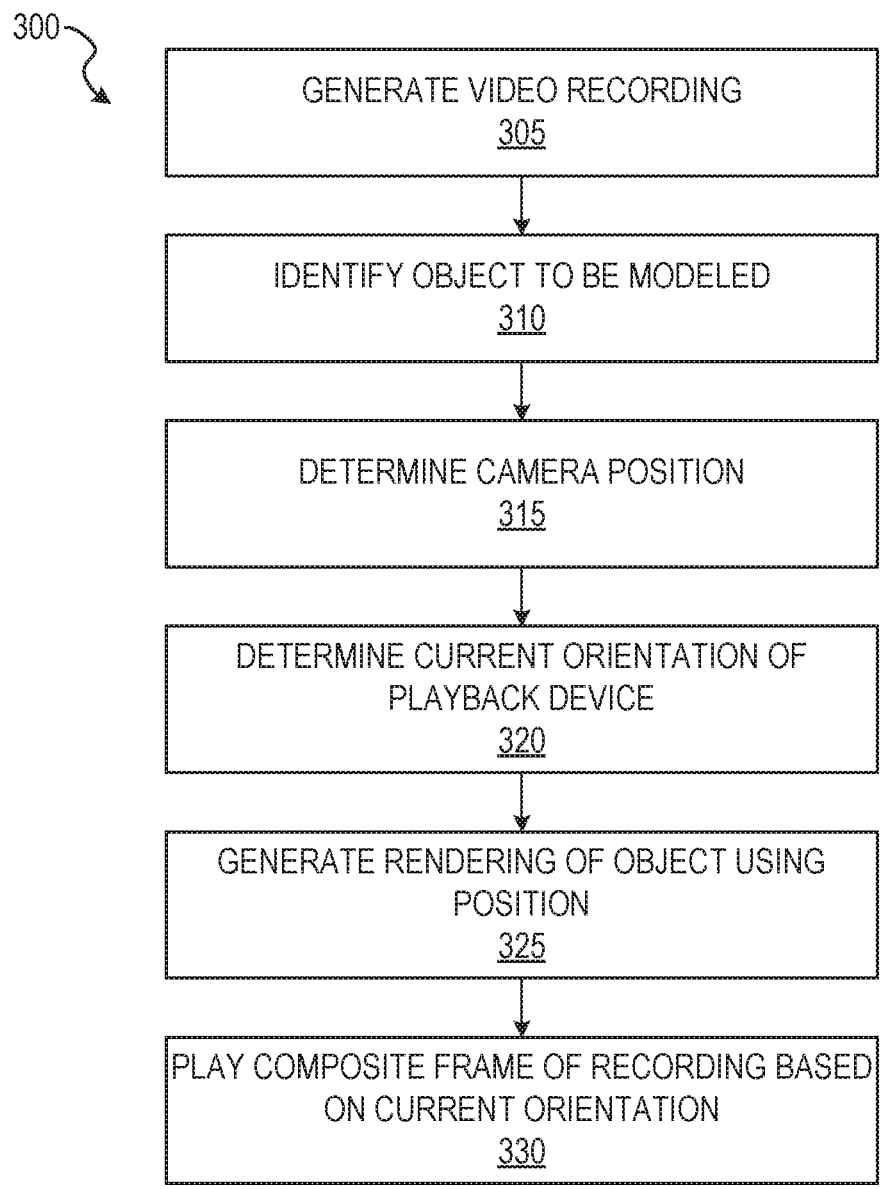
FIG. 3 illustrates a flow diagram of a method for dynamically modeling an object in an environment from different perspectives, according to some example embodiments.

FIG. 3 illustrates a flow diagram of a method 300 for dynamically modeling an object in an environment (e.g., a room) from different perspectives, according to some example embodiments. At operation 305, image capture engine 210 generates a video recording of a room. In some embodiments, the video recording is pre-generated. In those embodiments, the image capture engine 210 identifies the video recording file at operation 305.

At operation 310, the placement engine 240 receives an instruction to model an object in the room. The placement engine 240 identifies the object specified in the instruction as the object to be modeled in the room. At operation 315, the position engine 250 determines the position for a virtual camera to be used in rendering. In some example embodiments, the position is the height above the room floor. Different approaches for determining the position are discussed in further detail below.

At operation 320, the IMU engine 220 determines the current orientation of the playback device. For example, the IMU engine 220 uses a gyroscope to determine the orientation of the client device 110 configured to play the video recording. At operation 325, the render engine 230 generates one or more renders of the virtual object based on the virtual camera position. In some embodiments, the rendering is performed in real-time using a 3D model engine, such as Unity. At operation 330, the playback engine 260 displays a composite frame depicting the object rendered as a 3D model in the room in real time. In some example embodiments, each time the current orientation of the playback device changes, a new composite frame is displayed showing the object rendered from the new perspective according to the changed orientation of the playback device.

Figure 4A:
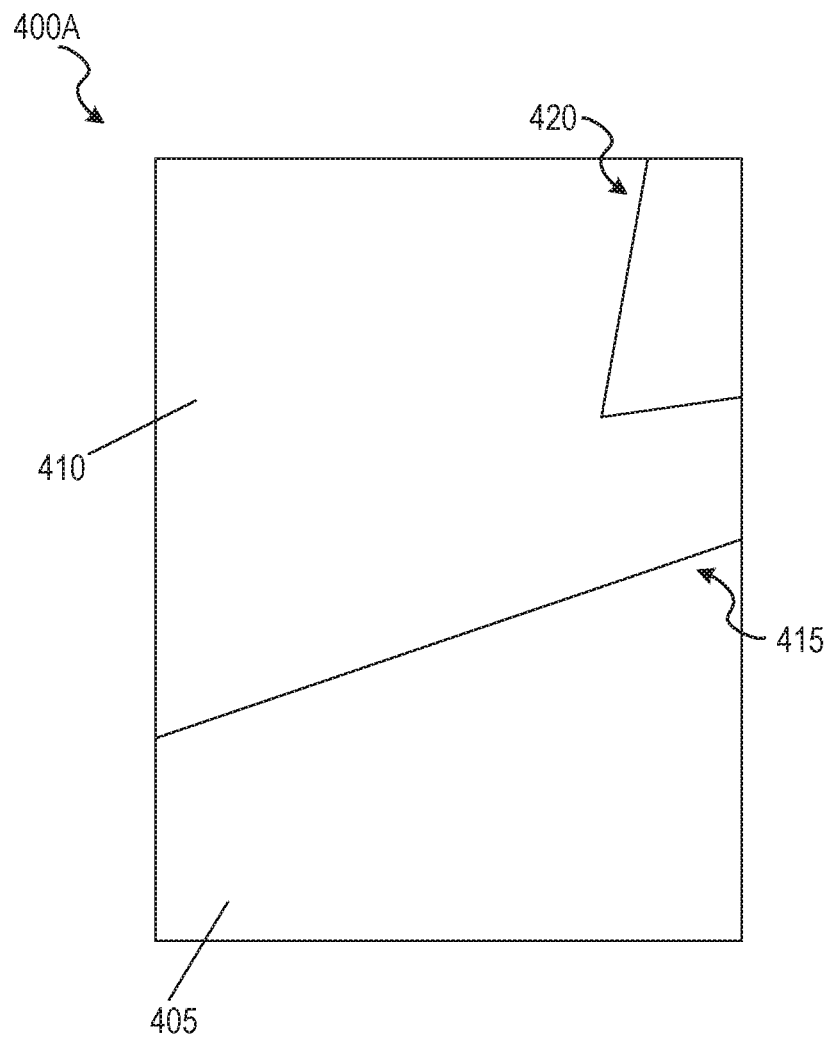
FIGS. 4A-C show frames of a video recording of an environment, according to an example embodiment.
Figure 4B:
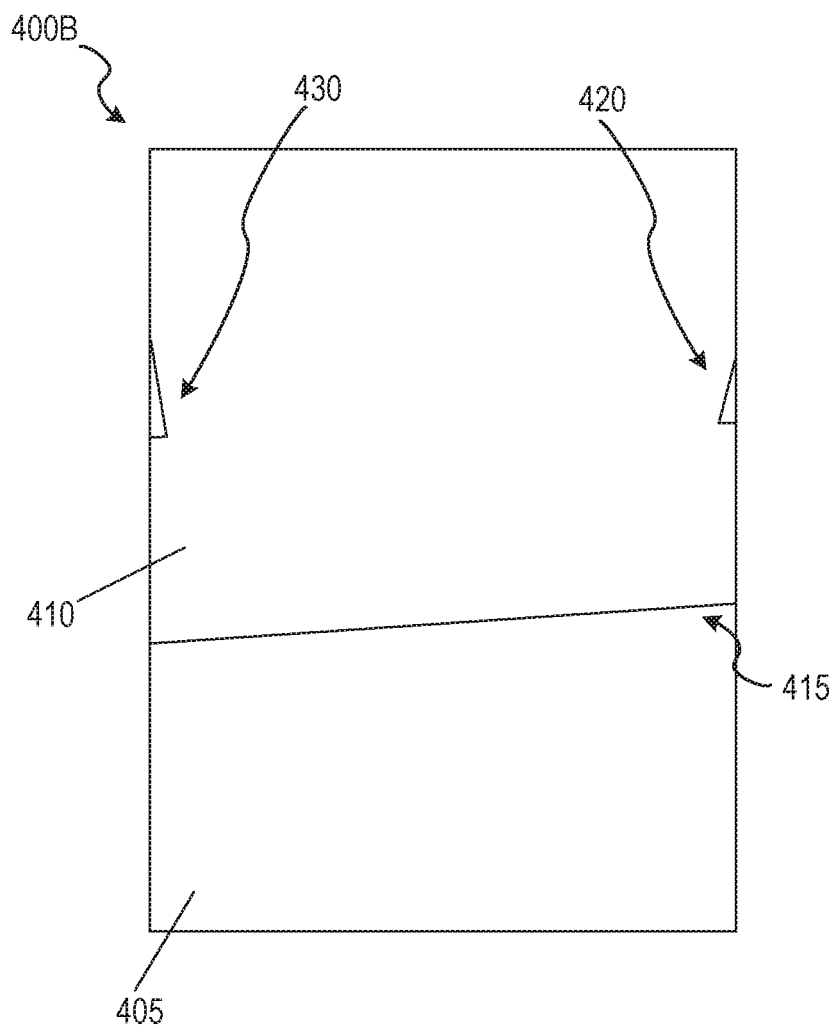
Figure 4C:
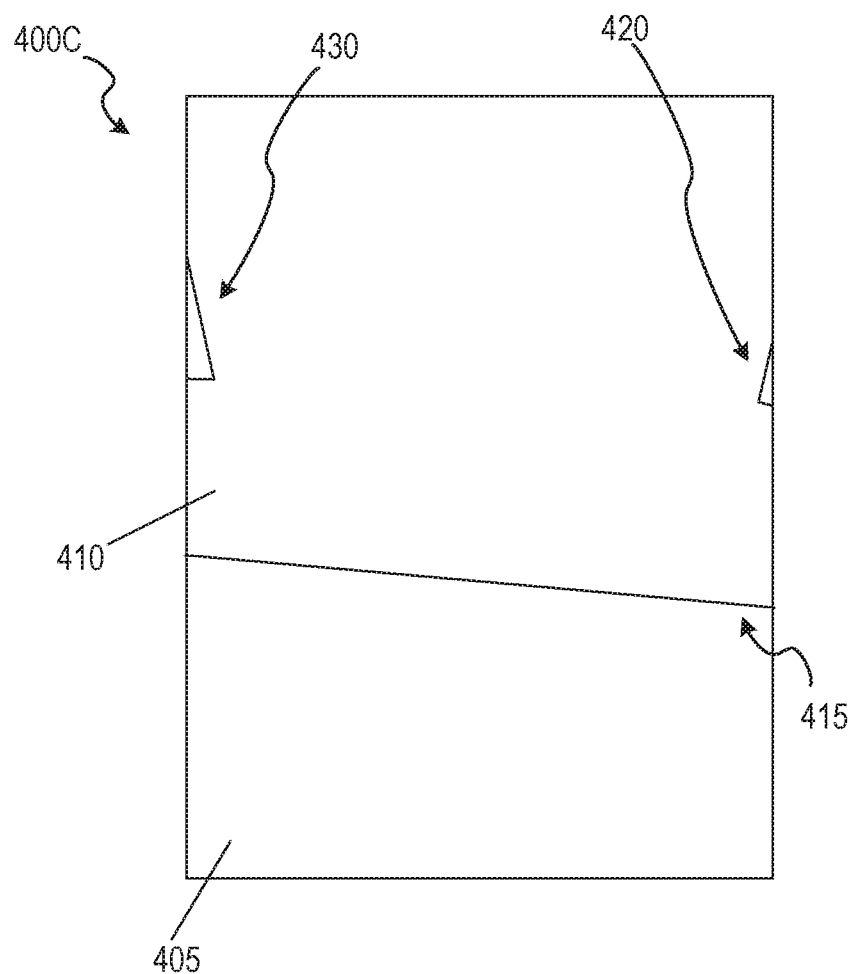

FIG. 4A-C show frames of a video recording of an environment (e.g., a room), according to an example embodiment. In particular, FIG. 4A shows frame 400A which depicts a room. The room includes a floor 405, a wall 410, a corner 415, and a window 420. FIG. 4B shows frame 400B depicting the room at a slightly different perspective. The difference in perspective is due to the recording device (e.g., client device 110) being moved around (e.g., rotated a portion of 180 degrees along an arc, or translated as the user 106 walks forward) as each frame 400 is captured.

In FIG. 4B, due the position or orientation change of the recording device, an additional window 430 is visible. FIG. 4C shows frame 400C depicting the room at a slightly different perspective (e.g., rotated counter clockwise). As the image capture engine 210 captures each frame (e.g., frames 400A-C), the IMU engine 220 generates orientation data for each frame 400. The orientation data specifies how the recording device (e.g., client device 110) was orientated at the time the frame 400 was captured. Each orientation data item may be stored as metadata for their corresponding frames 400.

Figure 5:
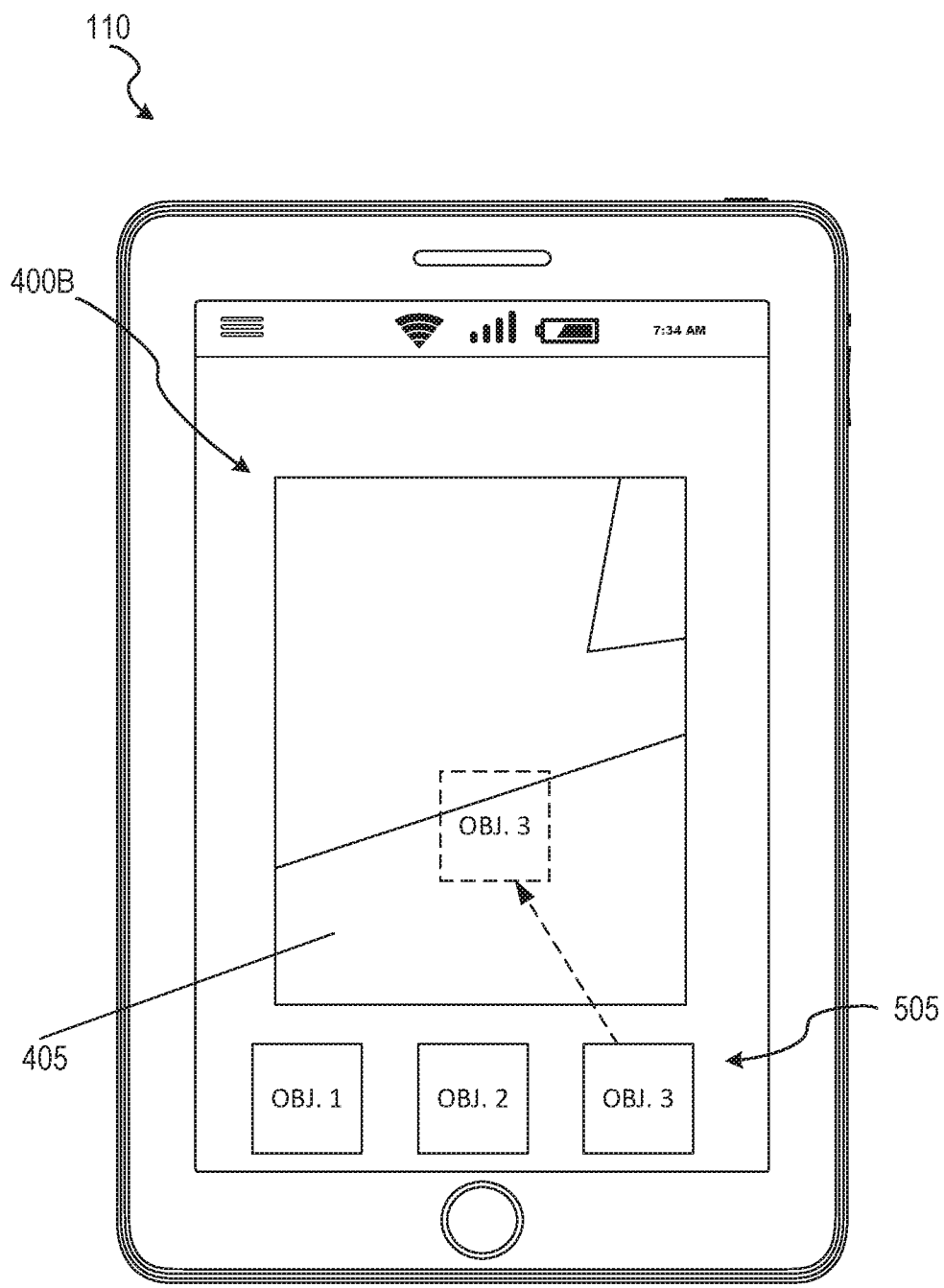
FIG. 5 shows an example of the client device as a tablet computer being used for placement of an object, according to some example embodiments.

FIG. 5 shows an example of the client device 110 as a tablet computer, according to some example embodiments. In the depicted example, the client device 110 is both the device that captures the video recording and the device that plays back the recording. In FIG. 5, placement engine 240 displays frame 400B with a menu 505 of a plurality of objects that can be simulated in the room. As an example, object 1 ("Obj. 1") may be a picture of a chair, object 2 ("Obj. 2") may be a picture of a floor lamp, and object 3 ("Obj. 3") may be a picture of a table. Each of the objects have 3D model data that can be used to real-time render a model of the object in the room. The 3D model data may be stored in local memory of the client device 110 or on the server side in database 126. In some example embodiments, the client device 110 retrieves the 3D model data for one or more of the objects and caches it for processing. In some example embodiments, a user 106 may select an object to model in the room by dragging and dropping one of the objects onto an area of the depicted room. For example, as illustrated, a user 106 has selected object 3 and dragged and dropped it in the center of frame 400B as indicated by the broken line arrow pointing to the broken line box of object 3. In response to the drag and drop instruction, the position engine 250 determines the approximate position of client device 110 as it recorded the video sequence. In some example embodiments, the position is the height above the floor 405 of the room. Further approaches for determining position are discussed below.

Figure 6A:
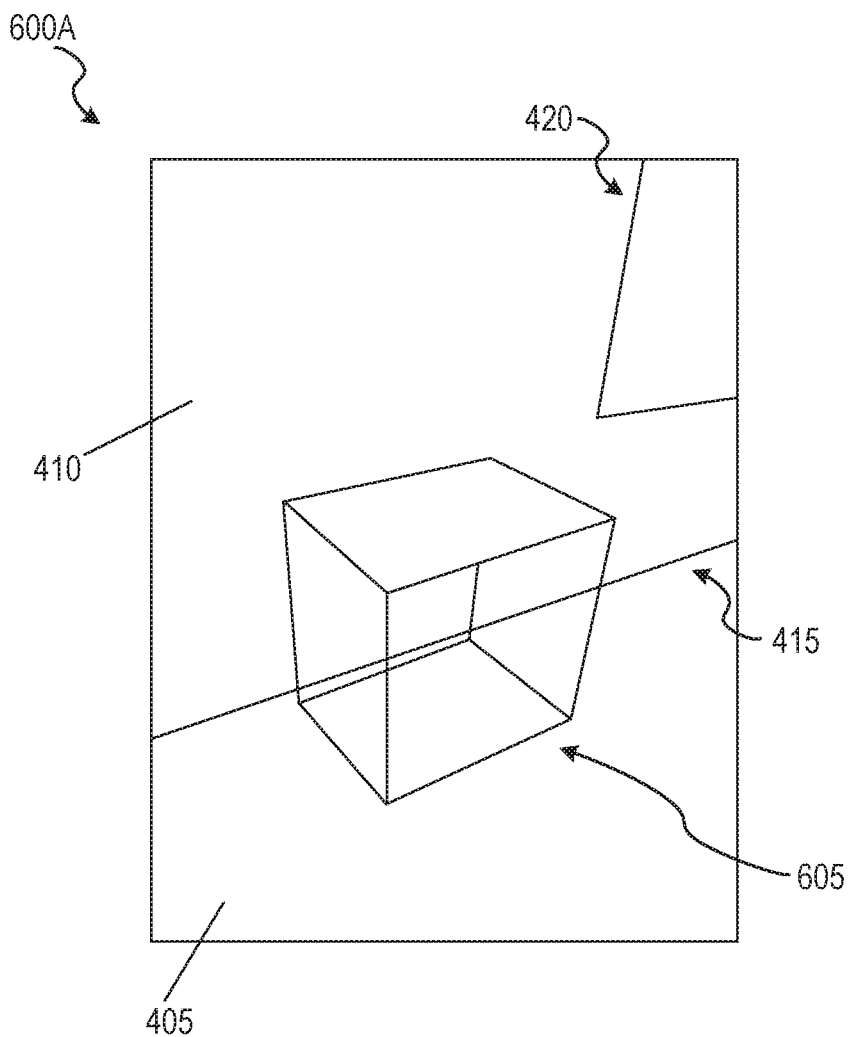
FIGS. 6A-C show composite frames of an object modeled in the room, according to some example embodiments.
Figure 6B:
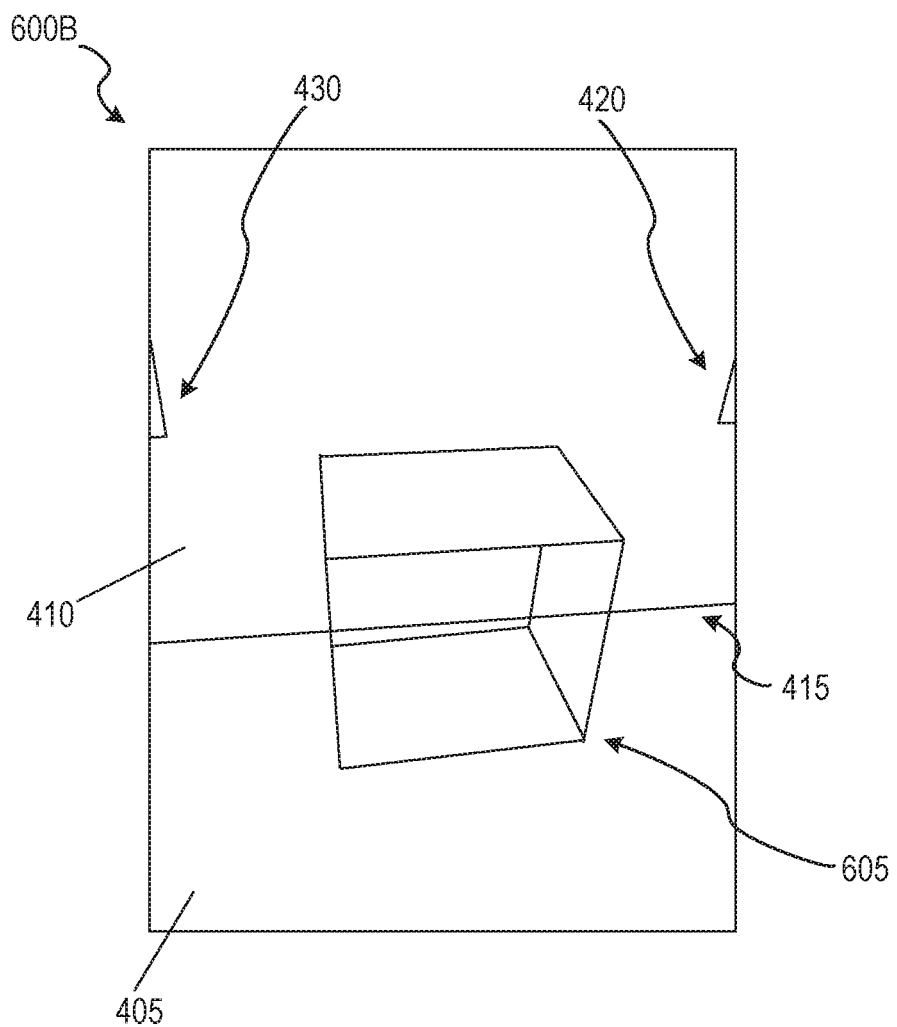
Figure 6C:
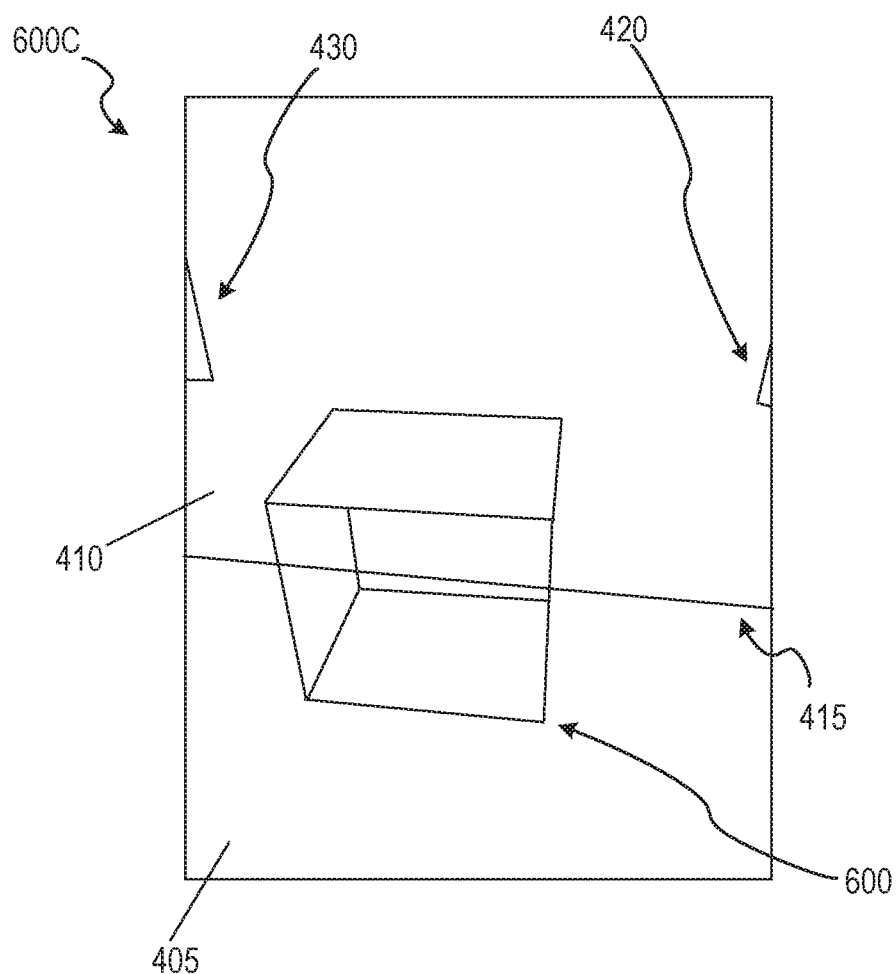

FIGS. 6A-C show composite frames 600A-C of the object 605 modeled in the room, according to some example embodiments. In particular, FIG. 6A shows a composite frame 600A with a 3D model of the object 605 displayed at a first perspective. FIG. 6B shows a composite frame 600B with a 3D model of the object 605 displayed in a second perspective (e.g., slightly rotated counter clockwise but generally pointing in the same area of the room). FIG. 6C shows a composite frame 600C with the 3D model of the virtual object 605 displayed at a third perspective (e.g., further rotated counter clockwise). In some example embodiments, the composite frames 600A-C are played as a video sequence with no input of IMU data. For example, a user 106 may upload the composite video recording to a website, which plays each frame 600 one after the other in the same sequence as the frames 600 were recorded. In some example embodiments, the current orientation of the playback device is identified using the IMU engine 220, and the frame 600 that corresponds to the current orientation is played on the playback device. For example, if the client device 110 is the playback device, the client device 110 may display frame 600A and then 600B in response to a counter clock wise rotation of the client device 110. Then, in response to the client device 110 being rotated in a clockwise direction, the frame 600B may play again, then 600A may be displayed. Although only three frames are depicted in FIGS. 6A-6C, it is appreciated that a multitude of frames from potentially a multitude of orientations can be modeled and replayed in a similar manner. Further, frames can be generated for insertion between the recorded frames (e.g., through Motion Estimation Motion Compensation (MEMC) algorithms or other frame estimation and generation techniques. In this way, the playback of the item can be smoothed using frame rates that are higher than what was recorded.

Figure 7:
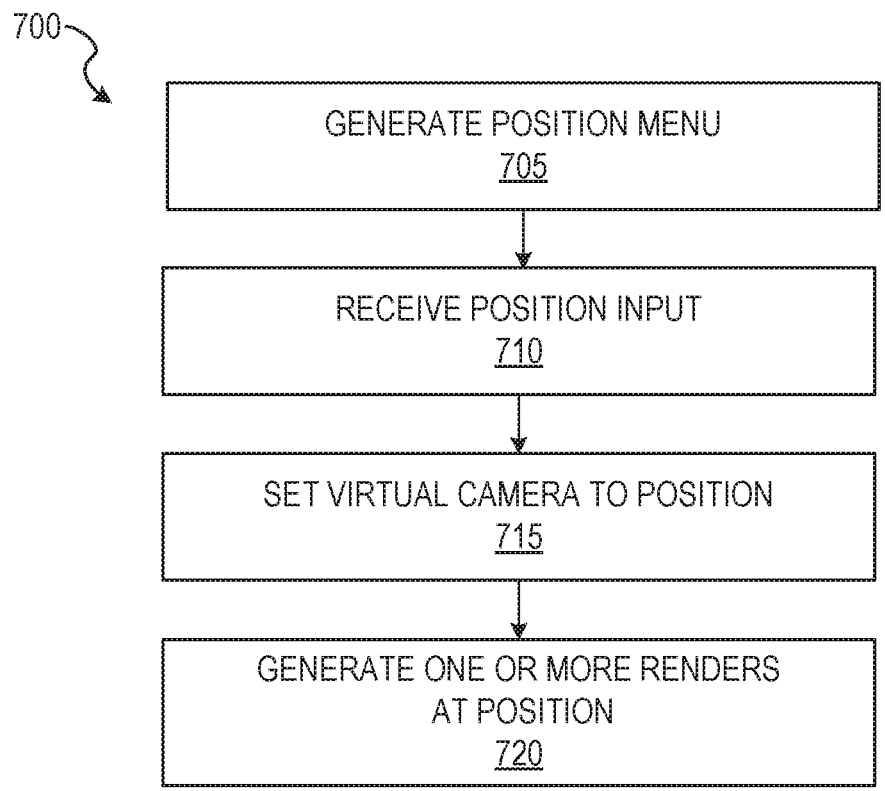
FIG. 7 shows a flow diagram of a method for determining the position of the recording device, according to some example embodiments.

FIG. 7 shows a flow diagram of a method 700 for determining the position of the camera, according to some example embodiments. At operation 705, the position engine 250 generates a position menu for display on client device 110. The position menu may have different options for the user's height, where the user 106 is the person that used the client device 110 to record the video recording of the room. For example, the menu may include three options: "Short (below 5 feet)", "Medium (5 to 6 feet)", and "Tall (over 6 feet)". At operation 710, the placement engine 240 receives selection of one of the options. At operation 715, the render engine 230 sets the height of the virtual camera used to render the object to the height received from the user 106. At operation 720, the render engine 230 renders the object as a 3D object in the room (e.g., renders using real-time rendering or pre-generated renders).

Figure 8:
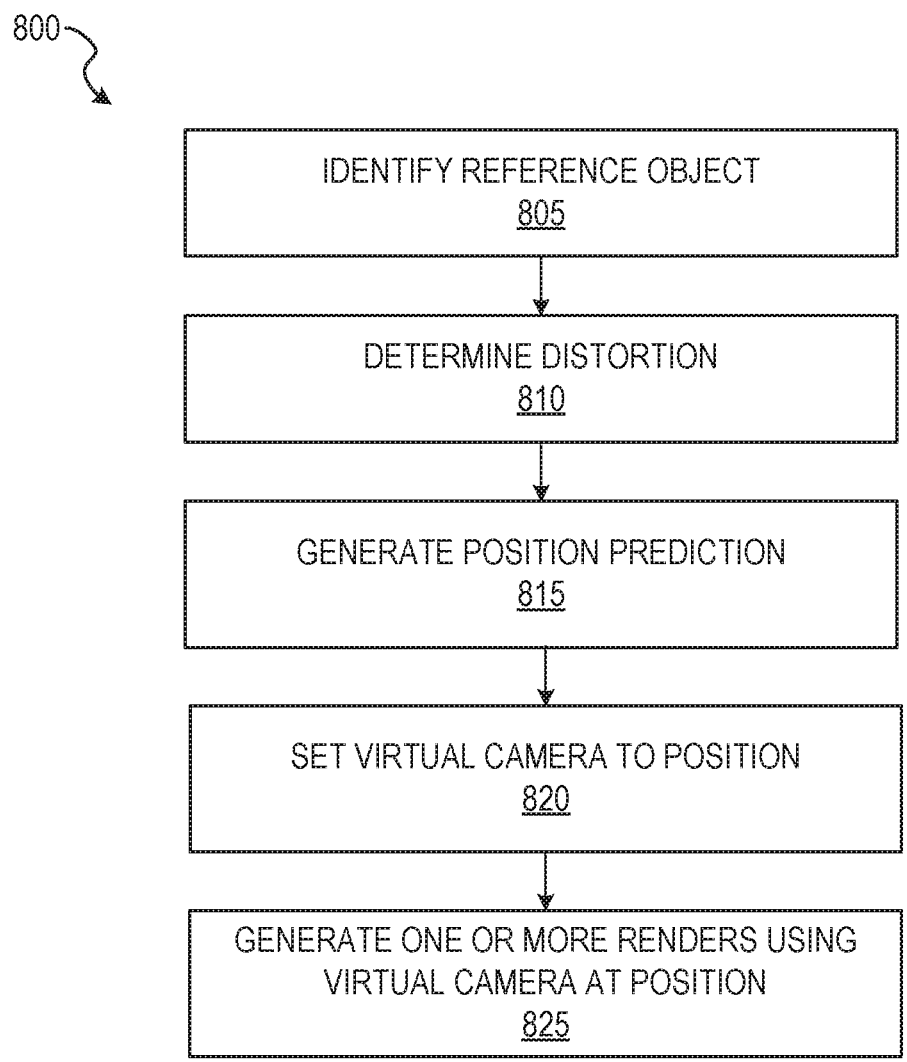
FIG. 8 shows a flow diagram of a method for determining the position of the camera, according to some example embodiments.

FIG. 8 shows a flow diagram of a method 800 for determining the position (e.g., height) of the camera, according to some example embodiments. At operation 805, a reference object is identified in the video recording. For example, the reference object may be a United States twenty dollar bill placed on the floor 405 or a 12 ounce aluminum soda pop can placed on the floor 405. At operation 810, the position engine 250 determines the distortion of the reference object. The distortion is the change in the apparent dimensions of the reference object due to the object being placed far away from the camera or due to the height of the user 106 recording the room with the client device 110. Examples of distortion are further discussed below, with reference to FIGS. 9A and 9B. At operation 815, the position engine 250 generates a position prediction. For example, the position engine 250 uses the distortion data to determine that the user 106 is in an "over 6 feet" category. At operation 820, the render engine 230 sets the virtual camera to the predicted position of six feet above the floor 405. The virtual camera is the camera used to render the virtual object 605. At operation 825, the render engine 230 generates renders of the virtual object 605 as viewed from the virtual camera set to six feet above the floor 405.

Figure 9A:
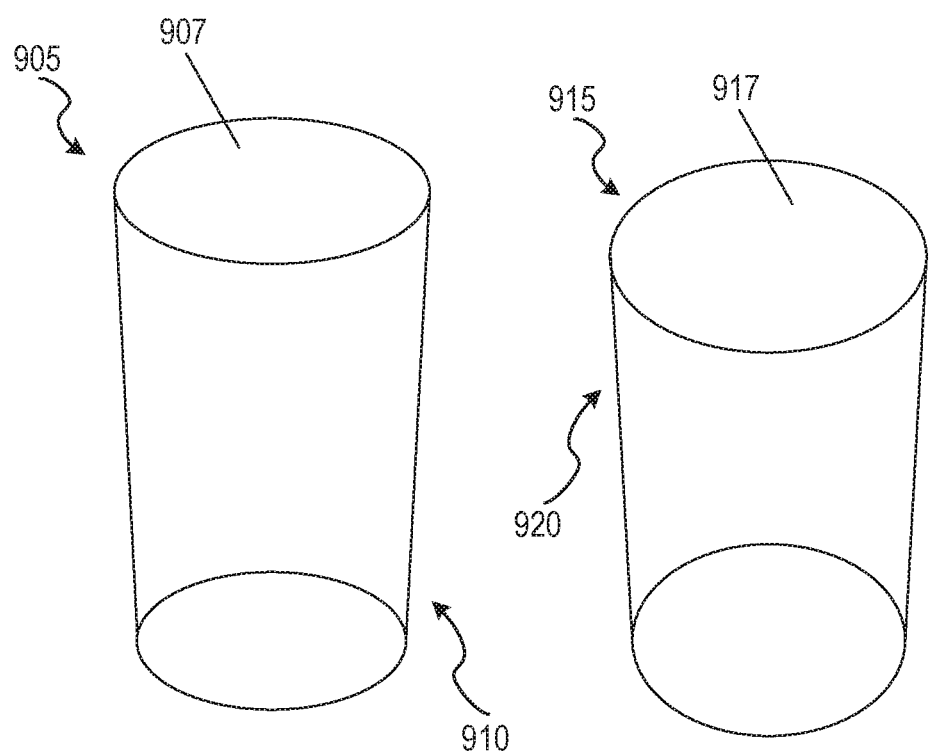
FIG. 9A-B illustrate example reference objects for position analysis, according to some example embodiments.

FIG. 9A illustrates two example reference objects for distortion analysis, according to some example embodiments. The position engine 250 can be configured to recognize cans of soda, e.g., cylinders 905 and 915, for use as reference objects, according to some example embodiments. However, one of ordinary skill in the art will appreciate that the position engine 250 may be configured to identify and measure different reference objects (e.g., United States twenty dollar bill). In FIG. 9A, both cylinders 905 and 915 have identical physical dimensions, and both are standing from their respective bottoms on a floor (not depicted). However, the two cylinders 905, 915 appear to have different dimensions because they are being viewed by different users of different heights.

In particular, cylinder 905 is viewed by a relatively short person (e.g., four feet tall). As a consequence of the viewer being shorter, less of the top of the can 907 is visible and the side wall 910 appears longer. Further, cylinder 915 is being viewed by a relatively tall person (e.g., six feet tall). As a consequence of the viewer being taller, more of the top of the can 917 is visible and the side wall of the can 920 appears shorter. The difference in the dimensions due to the height of the user 106 is the distortion detected in operation 810 of FIG. 8. For example, due to less of the top of the can 907 being visible and the side wall 910 being longer, the position engine 250 may assign the camera position height at four feet (e.g., at operation 815 in FIG. 8). Further, due to more of the top of the can 917 being visible and the side wall 920 being shorter, the position engine 250 may assign the camera height at six feet (e.g., at operation 815 in FIG. 8).

In some example embodiments, to simplify position detection, all users 106 are put into one of several categories, such as short, medium, or tall. Based on the apparent dimensions of the reference object being distorted, the position engine 250 may place a user 106 in one of the three categories and set the virtual camera to a corresponding height. For example, if the side wall of a reference can of soda is within a range of longer lengths at a given distance from the can, the position engine 250 may assume the user 106 is in the shorter category and set the camera to four feet above the floor 405, regardless of if the user 106's height is actually four feet two inches or four feet and three inches. Similarly, if the side wall of a reference can of soda is within a range of shorter lengths at a given distance from the can, the position engine 250 may assume the user 106 is in the taller category and set the camera to six feet above the floor 405, regardless of whether the user 106 is actually five feet and eleven inches or six feet and one inch tall.

Figure 9B:
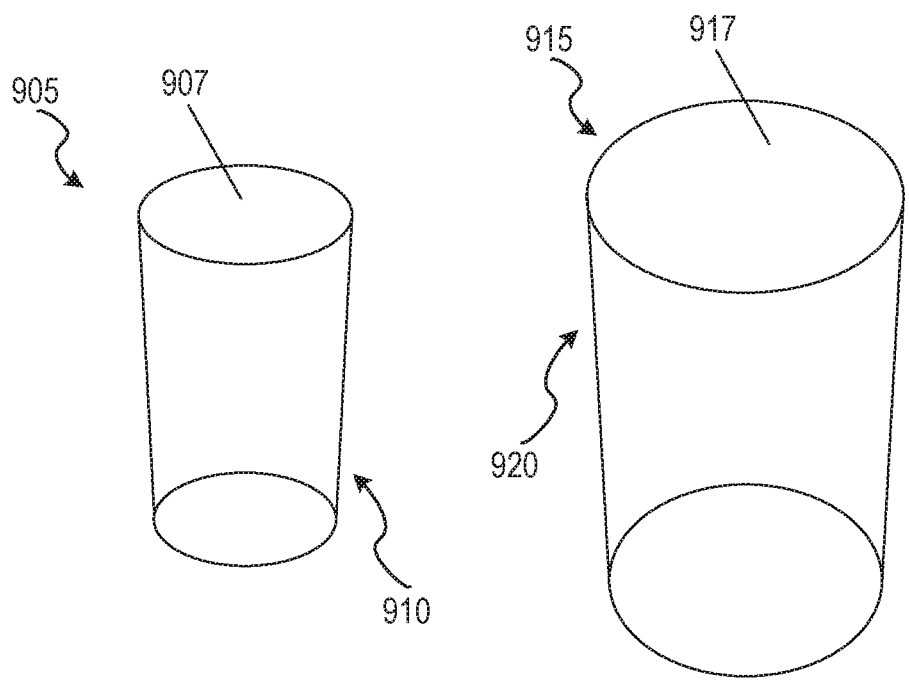

FIG. 9B shows an example of reference objects being used for a distance calculation. In some example embodiments, to accurately determine the apparent dimensions of the reference object, the distance to the reference object is utilized. Because the position engine 250 knows the true size of the reference object, if the reference object in a given frame 600 of the recording appears small, then the position engine 250 assumes the reference object is farther away and sets the distance too far (e.g., ten feet away). The distances may be used to avoid measurement errors of the apparent dimensions of the reference object. For example, in FIG. 9B, the side wall 910 of the cylinder 905 is shorter than side wall 920 of the cylinder 915 even though the cylinder 905 is being viewed from a shorter person, which usually results in the side walls appearing longer. Thus, in some example embodiments, the distance to the reference objects is first estimated using the overall size of the object. After the distance to object is determined, the distortion due to height perspectives can more accurately be determined. Further, according to some example embodiments, camera calibration information can be used to correct errors in distance calculations. Example of parameters that can be analyzed to more accurately determine distances include perspective field of view of the camera, focal length of the camera, resolution, skew, and distortion from one or more lenses. The parameters can be retrieved from camera driver information, calculated through calibration, or received from an application programming interface (API) (e.g., an API of API server 120).

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not bE configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an application program interface (API)).

The performance of certain of the operations may be distributed among the processors, not only residing within a single machine, but deployed across a number of machines. In sonic example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-9B are implemented, in some embodiments, in the context of a machine and an associated software architecture. The sections below describe a representative software architecture and machine (e.g., hardware) architecture that are suitable for use with the disclosed embodiments.

Figure 10:
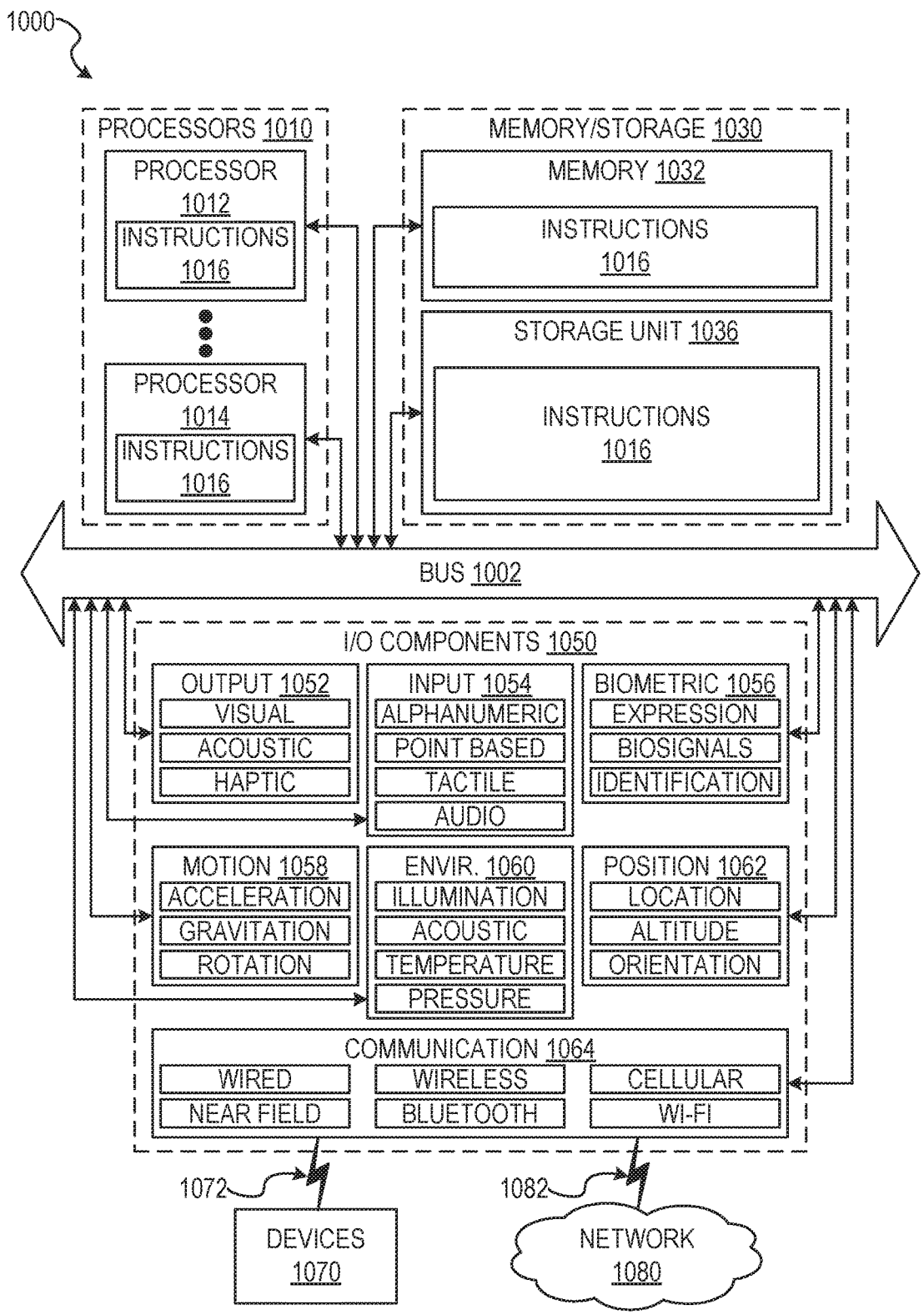
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to sonic example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code), for causing the machine 1000 to perform any one or more of the methodologies discussed herein, can be executed. For example, the instructions 1016 can cause the machine 1000 to execute the flow diagrams of FIGS. 3, 7, and 8. Additionally, or alternatively, the instruction 1016 can implement the image capture engine 210, an inertial motion unit (MU) engine 220, a render engine 230, a placement engine 240, a position engine 250, and a playback engine 260 of FIG. 2, and so forth. The instructions 1016 transform the general, non-programmed machine 1000 into a particular machine programmed to carry out the described and illustrated functions in the manner described. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include processors 1010, memory/storage 1030, and I/O components 1050, which can be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) can include, for example, processor 1012 and processor 1014 that may execute instructions 1016. The term "processor" is intended to include multi-core processors 1010 that may comprise two or more independent processors 1012, 1014 (sometimes referred to as "cores") that can execute instructions 1016 contemporaneously. Although FIG. 10 shows multiple processors 1010, the machine 1000 may include a single processor 1010 with a single core, a single processor 1010 with multiple cores (e.g., a multi-core processor 1010), multiple processors 1010 with a single core, multiple processors 1010 with multiples cores, or any combination thereof.

The memory/storage 1030 can include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 can also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, the term "machine-readable medium" means a device able to store instructions 1016 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 can include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 can include output components 1052 and input components 1054. The output components 1052 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1050 can include biometric components 1056, motion components 1058, environmental components 1060, or position components 1062 among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 can include acceleration sensor components (e.g., an accelerometer), gravitation sensor components, rotation sensor components (e.g., a gyroscope), and so forth. The environmental components 1060 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 can include location sensor components (e.g., a Global. Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or other suitable device to interface with the network 1080 in further examples, communication components 1064 include wired communication components, wireless communication components, cellular communication components, near field communication (NFC) components, BLUETOOTH® components BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 can detect identifiers or include components operable to detect identifiers. For example, the communication components 1064 can include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or other type of cellular or wireless coupling. In this example, the coupling 1082 can implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 can be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 can be transmitted or received using a transmission medium via the coupling 1072 (e.g., a peer-to-peer coupling) to devices 1070. The term "transmission medium" shall be taken to include any intangible medium that is capable of storing, encoding, or carrying the instructions 1016 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   identifying a video recording of an environment of a recording user device, the video recording including a plurality of frames of the environment that are associated with compass direction data generated by a recording user device compass of the recording user device that generated the video recording, each frame of the plurality of frames associated with compass direction data generated by the recording user device compass when the recording user device captured the frame;
   receiving an instruction to model a virtual object in the video recording of the environment;
   setting a virtual camera height for a virtual camera to one of a plurality of vertical heights, the virtual object being viewed from a different perspective by the virtual camera in each of the plurality of vertical heights, the one of the plurality of vertical heights to which the vertical camera height is set corresponding to a user height stored on a playback user device;
   detecting, using a playback user device compass, compass direction data describing a current orientation of the playback user device; and
   responsive to the current orientation, displaying, on a display screen of the playback user device, a composite frame displaying a depiction of the virtual object on a frame of the video recording that corresponds to the current orientation, the depiction of the virtual object generated by the virtual camera at the virtual camera height.

2. The method of claim 1, further comprising:
   detecting additional compass direction data describing a newer current orientation of the playback user device; and
   responsive to the detection of the newer current orientation, displaying, on the playback user device, an additional composite frame displaying an additional depiction of the virtual object on an additional frame of the video recording that corresponds to the newer current orientation, the additional depiction of the virtual object generated using the virtual camera height.

3. The method of claim 1, wherein the recording device and the playback user device are different end-user client devices.

4. The method of claim 1, wherein the user height is input into the recording user device through a display interface.

5. The method of claim 1 wherein which frame of the plurality of frames is included as the composite frame continuously changes based on dynamic updates of the current orientation as the playback user device moves.

6. The method of claim 1, wherein the instruction is received through an input device of a playback user device, the input device including at least one of: a touchscreen, a keyboard, a mouse.

7. The method of claim 6, wherein receiving the instruction comprises:
   receiving, from the user manipulating the touchscreen of the playback user device, an initial instruction to drag a representation of the object across at least one of the frames of the plurality of frames, and drop the object on an area in the at least one of the frames of the plurality of frames.

8. The method of claim 1, wherein the compass direction data is heading data generate by an integrated gyroscope or an integrated compass of the recording user device.

9. A system comprising:
   one or more processors of a machine;
   a display screen;
   an integrated compass; and
   a memory comprising instructions that, when executed by the one or more processors, cause the machine to perform operations comprising:
   identifying a video recording of an environment of a recording user device, the video recording including a plurality of frames of the environment that are associated with compass direction data generated by a recording device compass of a recording user device that generated the video recording, each frame of the plurality of frames associated with compass direction data generated by the recording user device compass when the recording user device captured the frame;
   receiving an instruction to model a virtual object in the video recording of the environment;
   setting a virtual camera height for a virtual camera to one of a plurality of vertical heights, the virtual object being viewed from a different perspective by the virtual camera in each of the plurality of vertical heights, the one of the plurality of vertical heights to which the vertical camera height is set corresponding to a user height stored in the memory;
   detecting, using the integrated compass, compass direction data describing a current orientation of the system; and
   responsive to the current orientation, displaying, on the display screen, a composite frame displaying a depiction of the virtual object on a frame of the video recording that corresponds to the current orientation, the depiction of the virtual object generated by the virtual camera at the virtual camera height.

10. The system of claim 9, the operations further comprising:
  detecting additional compass direction data describing a newer current orientation of the system; and
  responsive to the detection of the newer current orientation, displaying, on the display screen, an additional composite frame displaying an additional depiction of the virtual object on an additional frame of the video recording that corresponds to the newer current orientation, the additional depiction of the virtual object generated using the virtual camera position.

11. The system of claim 9, wherein the recording device and the system are different ender-user client devices.

12. The system of claim 9, wherein the user height is input into the recording user device through a display interface.

13. The system of claim 9, wherein which frame of the plurality of frames is included as the composite frame continuously changes based on dynamic updates of the current orientation as the system moves.

14. The system of claim 9, wherein the instruction is received through an input device of the system, the input device including at least one of: a touchscreen, a keyboard, a mouse.

15. The system of claim 14, wherein receiving the instruction comprises:
  receiving, from a user manipulating the touchscreen of the system an initial instruction to drag a representation of the object across at least one of the frames of the plurality of frames as displayed on the display screen, and drop the object on an area in the at least one of the frames of the plurality of frames.

16. The system of claim 9, wherein the compass direction data is heading data generate by an integrated gyroscope or an integrated compass of the recording user device.

17. A computer readable storage medium comprising instructions that, when executed by one or more processors of a device, cause the device to perform operations comprising:
  identifying a video recording of an environment of a recording device, the video recording including a plurality of frames of the environment that are associated with compass direction data generated by a recording user device compass of a recording user device that generated the video recording, each frame of the plurality of frames associated with compass direction data generated by the recording user device compass when the recording user device captured the frame;
  receiving an instruction to model a virtual object in the video recording of the environment;
  setting a virtual camera height for a virtual camera to one of a plurality of vertical heights, the virtual object being viewed from a different perspective by the virtual camera in each of the plurality of vertical heights, the one of the plurality of vertical heights to which the vertical camera height is set corresponding to a user height stored on a playback user device;
  detecting, using a playback user device compass, inertial motion sensor data describing a current orientation of the playback user device; and
  responsive to the current orientation, displaying, on a display screen of the playback user device, a composite frame displaying a depiction of the virtual object on a frame of the video recording that corresponds to the current orientation, the depiction of the virtual object generated by the virtual camera at the virtual camera height.

18. The computer readable storage medium of claim 17, wherein the recording device and playback user device are end-user client different devices.

* * * * *